(12) United States Patent
Liu et al.

(10) Patent No.: US 11,761,599 B1
(45) Date of Patent: Sep. 19, 2023

(54) NATURAL LIGHT HOMOGENIZATION LIGHTING DEVICE BASED ON COMBINATION OF BICONVEX LENSES AND SEMI-TRANSPARENT LENSES

(71) Applicant: GLORY LIGHT TECHNOLOGY CO., LTD., Harbin (CN)

(72) Inventors: Jian Liu, Harbin (CN); Xinwei Wang, Harbin (CN); Xumin Ding, Harbin (CN)

(73) Assignee: GLORY LIGHT TECHNOLOGY CO., LTD., Harbin (CN)

( * ) Notice: Subject to any disclaimer, the term of this patent is extended or adjusted under 35 U.S.C. 154(b) by 0 days.

(21) Appl. No.: 18/105,784

(22) Filed: Feb. 3, 2023

(30) Foreign Application Priority Data

Oct. 13, 2022 (CN) .......................... 202211251858.6

(51) Int. Cl.
  *F21S 11/00* (2006.01)
  *G02B 3/00* (2006.01)
  *F21V 5/04* (2006.01)

(52) U.S. Cl.
  CPC .............. *F21S 11/007* (2013.01); *F21V 5/04* (2013.01); *G02B 3/0037* (2013.01); *G02B 2207/00* (2013.01)

(58) Field of Classification Search
  CPC .......... F21S 11/002; F21S 11/007; E06B 9/24
  See application file for complete search history.

(56) References Cited

U.S. PATENT DOCUMENTS

| | | | |
|---|---|---|---|
| 2017/0362883 A1* | 12/2017 | Kanno | F21S 11/007 |
| 2018/0170012 A1* | 6/2018 | Ueki | G02B 5/0294 |
| 2020/0025979 A1* | 1/2020 | Shen | F21V 5/007 |
| 2020/0096167 A1* | 3/2020 | Asaoka | G02B 5/0231 |
| 2020/0256532 A1* | 8/2020 | Shinozaki | E06B 9/26 |
| 2020/0309337 A1* | 10/2020 | Yui | G02B 5/00 |

* cited by examiner

*Primary Examiner* — Tracie Y Green
*Assistant Examiner* — Michael Chiang
(74) *Attorney, Agent, or Firm* — IPRO, PLLC

(57) ABSTRACT

The present invention relates to a natural light homogenization lighting device, and particularly relates to a natural light homogenization lighting device based on combination of biconvex lenses and semi-transparent lenses. The present invention aims to solve the problems of low efficiency and poor lighting uniformity of light pipes, and possible damage to the original building structure in the process of installation and not conducive to the promotion and popularization of the existing solar energy conversion devices. The device of the present invention includes a positive lens combination and a positive half-lens combination; the positive lens combination and the positive half-lens combination are arranged side by side, the positive lens combination is located outdoors, and the positive half-lens combination is located indoors. The present invention belongs to the technical field of lighting systems.

3 Claims, 2 Drawing Sheets

NATURAL LIGHT HOMOGENIZATION LIGHTING DEVICE BASED ON COMBINATION OF BICONVEX LENSES AND SEMI-TRANSPARENT LENSES

TECHNICAL FIELD

The present invention relates to a natural light homogenization lighting device, and belongs to the technical field of lighting systems.

BACKGROUND

Research and development of natural light lighting technology in China started in the 1960s and 1970s. Since the "Green Lighting" Program was promoted in 1996, the green energy concept of natural light lighting has gradually come into the public view. With continuous in-depth research on the solar lighting technology, people also have an in-depth understanding of the natural light collection and lighting systems. Due to gradual depletion of natural resources such as oil and coal, researches on solar energy are increasing, and the shortcomings of solar energy application technology lie in relatively low conversion efficiency of solar energy, but the cost is much higher than that of other traditional conversion energy methods. Therefore, improving the utilization efficiency of solar energy and reducing the conversion cost of solar energy have become important goals of researches in recent years.

In order to improve the utilization efficiency of sunlight, one of the methods is to use a solar concentrator combined with a light guide component module, whereby the sunlight is guided through the light guide component and conducted to the solar cells or thermal conduction components to improve the collection efficiency of sunlight, thereby improving the production efficiency of solar energy conversion devices. The known solar energy conversion devices require solar concentrators to gather the incident sunlight to many focal points on the light output side for use by solar cells or thermal conduction components. However, the focal length converging the light results in a huge volume of the known solar energy conversion devices, and such huge volume of devices not only requires relatively higher production and material costs and is hard to precisely move to control the sun tracking, but also requires a large area for installing the devices. The light pipes currently occupying the mainstream of the market suffer low efficiency and poor lighting uniformity, and may cause damage to the original building structure in the process of installation, which is not conducive to the promotion and popularization.

Therefore, how to perform the solar daylighting in an efficient manner on the basis of not changing the original building structure is an urgent problem to be solved by those skilled in the art.

SUMMARY

In order to solve the problems of low efficiency and poor lighting uniformity of light pipes, and possible damage to the original building structure in the process of installation and not conducive to the promotion and popularization of the existing solar energy conversion devices, the present invention thus provides a natural light homogenization lighting device based on combination of biconvex lenses and semi-transparent lenses.

To solve the above problem, the present invention adopts the technical solution as follows: the present invention includes a positive lens combination and a positive half-lens combination; the positive lens combination and the positive half-lens combination are arranged side by side, the positive lens combination is located outdoors, and the positive half-lens combination is located indoors.

Further, the positive lens combination is composed of a plurality of positive lenses in an array manner, and the positive half-lens combination is composed of a plurality of positive half-lenses in an array manner.

Further, the high-angle focused light of positive lenses falls on the lower end of positive half-lenses, and the parallel focused light source of positive lenses falls on the upper end of positive half-lenses.

Further, both positive lenses and positive half-lenses are made of high transmittance materials.

Further, the focal length of the positive lens combination is 1-5 times of that of the positive half-lens combination.

The beneficial effects of the present invention are: the present invention can efficiently collect the natural light incident into the window, disperse the light evenly to all directions indoors, homogenize the indoor lighting, make full use of natural light for indoor lighting, save energy and reduce emissions, and improve the energy utilization rate. Moreover, the lens array combination structure breaks the symmetry of light transmission and can effectively protect the indoor privacy. A variety of materials can be selected for the device, and the device is environmentally friendly and has no pollution, and can replace the lighting curtains, indoor shutters and window glasses to obtain better indoor lighting effect.

DETAILED DESCRIPTION

Figure 1:
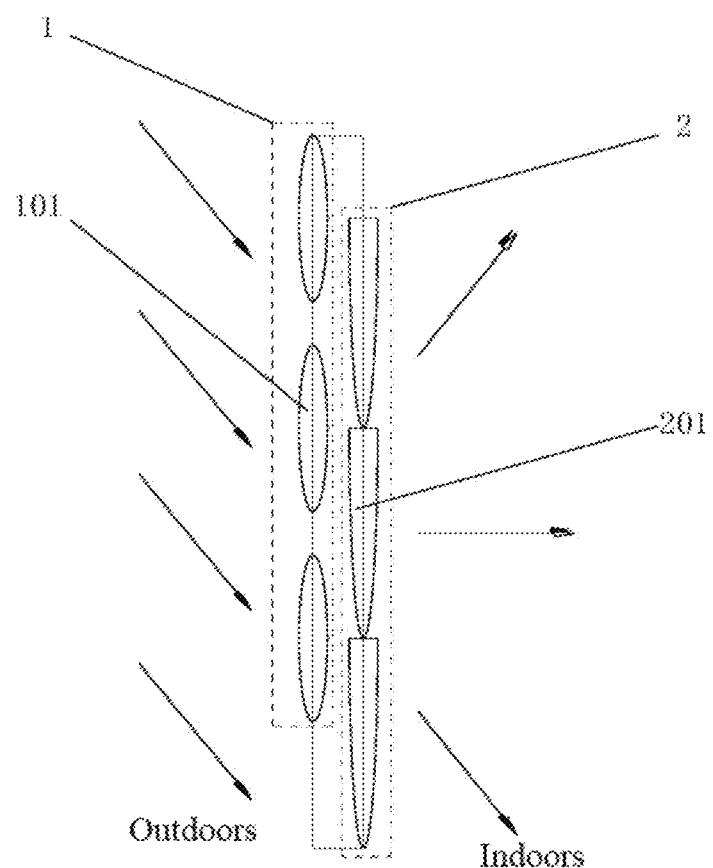
FIG. 1 is an overall schematic structural diagram of the present invention.
Figure 2:
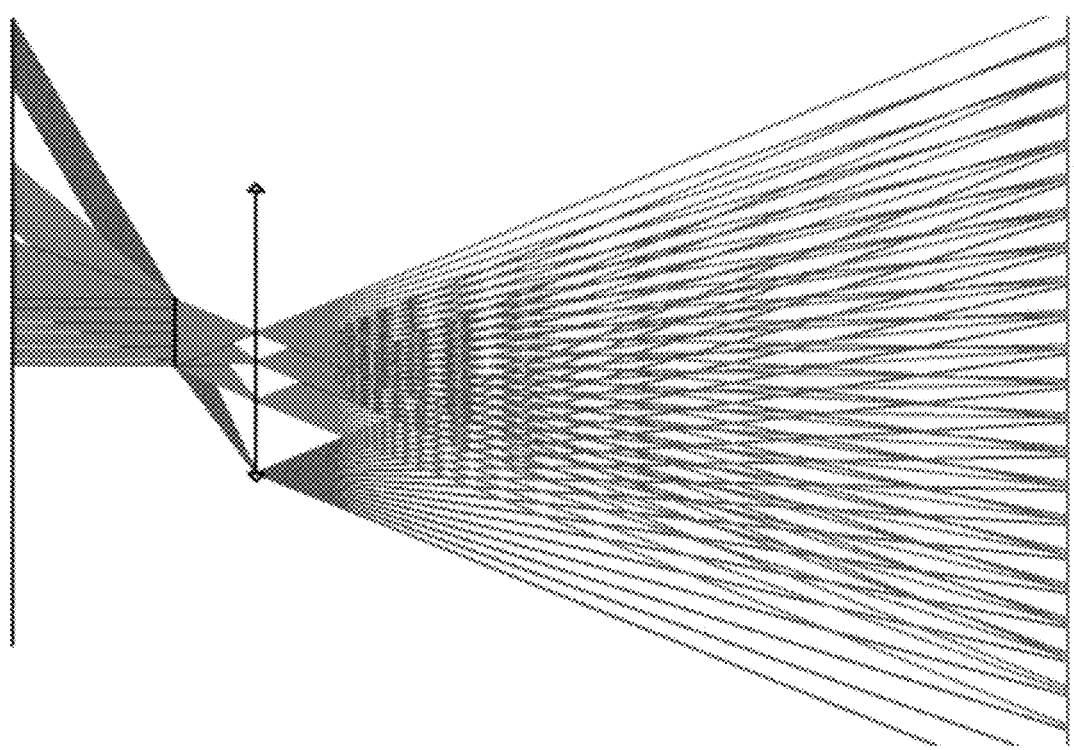
FIG. 2 is a schematic principle diagram of the present invention.

Specific embodiment 1: the present embodiment is described in conjunction with FIGS. 1 and 2, a natural light homogenization lighting device based on combination of biconvex lenses and semi-transparent lenses of the present embodiment includes a positive lens combination 1 and a positive half-lens combination 2; the positive lens combination 1 and the positive half-lens combination 2 are arranged side by side, the positive lens combination 1 is located outdoors, and the positive half-lens combination 2 is located indoors.

In the present embodiment, the normal of lens surface of the positive lens combination 1 forms an acute angle to the incident natural light angle, and the natural light incident at a high angle outdoors can be dispersed in parallel to all corners indoors after passing through the positive lens combination 1 and the positive half-lens combination 2.

Specific embodiment 2: the present embodiment is described in conjunction with FIGS. 1 and 2, in a natural light homogenization lighting device based on combination of biconvex lenses and semi-transparent lenses of the present embodiment, the positive lens combination 1 is composed of a plurality of positive lenses 101 in an array manner, and a positive half-lens combination 2 is composed of a plurality of positive half-lenses 201 in an array manner.

In the present embodiment, the focal point of the positive lenses 101 falls on the center of the positive half-lenses 201, thereby achieving horizontal dispersion of the light beam to indoor space.

The focal length of the positive lenses 101 is 5 mm, and the focal length of the positive half-lenses 201 is 5 mm, and the spacing between the positive lenses 101 and the positive half-lenses 201 is 5 mm.

Other components and connection relationships are the same as those in specific embodiment 1.

Specific embodiment 3: the present embodiment is described in conjunction with FIGS. 1 and 2, in a natural light homogenization lighting device based on combination of biconvex lenses and semi-transparent lenses of the present embodiment, the high-angle focused light of the positive lenses 101 falls on the lower end of positive half-lenses 201, and the parallel focused light source of positive lenses 101 falls on the upper end of positive half-lenses 201. Other components and connection relationships are the same as those in specific embodiment 2.

Specific embodiment 4: the present embodiment is described in conjunction with FIGS. 1 and 2, in a natural light homogenization lighting device based on combination of biconvex lenses and semi-transparent lenses of the present embodiment, both positive lenses 101 and positive half-lenses 201 are made of high transmittance materials.

In the present embodiment, high transmittance materials refer to glass, resin, transparent plastic, and the like.

Other components and connection relationships are the same as those in specific embodiment 2.

Specific embodiment 5: the present embodiment is described in conjunction with FIGS. 1 and 2, in a natural light homogenization lighting device based on combination of biconvex lenses and semi-transparent lenses of the present embodiment, the focal length of the positive lens combination 1 is 1-5 times of that of the positive half-lens combination 2. Other components and connection relationships are the same as those in specific embodiment 1.

The above are merely preferred embodiments of the present invention, and are not intended to limit the present invention in any form. Although the present invention has been disclosed in preferred embodiments, but they are not intended to limit the present invention. Without departing from the scope of the technical solution of the present invention, anyone skilled in the art may make many possible changes and modifications to the technical solution of the present invention by using the above disclosed technical contents. Any simple alteration, equivalent change and improvement which are made to the above embodiments in accordance with the technical essence of the present invention without departing from the contents of the technical solutions of the present invention all fall within the scope of protection of the technical solution of the present invention.

The invention claimed is:

1. A natural light homogenization lighting device, comprising a positive lens combination and a positive half-lens combination;
   wherein the positive lens combination and the positive half-lens combination are arranged side by side;
   wherein the positive lens combination comprises a plurality of positive lenses in an array, and a positive half-lens combination comprises a plurality of positive half-lenses in an array;
   wherein high-angle focused light of the positive lenses falls on a lower end of the positive half-lenses, and a parallel focused light source of the positive lenses falls on an upper end of the positive half-lenses.

2. The natural light homogenization lighting device according to claim 1, wherein both the positive lenses and the positive half-lenses are made of high transmittance materials.

3. The natural light homogenization lighting device according to claim 1, wherein a focal length of the positive lens combination is 1-5 times of that of the positive half-lens combination.

\* \* \* \* \*